US012020315B2

(12) United States Patent
Samid

(10) Patent No.: US 12,020,315 B2
(45) Date of Patent: Jun. 25, 2024

(54) BitMint LeVeL AUTO-REFERENTIAL MONEY TRADING PLATFORM

(71) Applicant: Gideon Samid, Rockville, MD (US)

(72) Inventor: Gideon Samid, Rockville, MD (US)

( * ) Notice: Subject to any disclaimer, the term of this patent is extended or adjusted under 35 U.S.C. 154(b) by 2 days.

(21) Appl. No.: 17/862,285

(22) Filed: Jul. 11, 2022

(65) Prior Publication Data

US 2023/0169581 A1    Jun. 1, 2023

Related U.S. Application Data

(63) Continuation-in-part of application No. 17/537,381, filed on Nov. 29, 2021, now Pat. No. 11,386,406.

(60) Provisional application No. 63/306,501, filed on Feb. 4, 2022, provisional application No. 63/292,954, filed on Dec. 22, 2021.

(51) Int. Cl.
| | | |
|---|---|---|
| *G06Q 30/00* | (2023.01) | |
| *G06Q 20/06* | (2012.01) | |
| *G06Q 20/40* | (2012.01) | |
| *G06Q 30/08* | (2012.01) | |
| *G06Q 40/04* | (2012.01) | |

(52) U.S. Cl.
CPC ......... *G06Q 30/08* (2013.01); *G06Q 20/0655* (2013.01); *G06Q 20/405* (2013.01); *G06Q 40/04* (2013.01)

(58) Field of Classification Search
CPC .................................................. G06Q 30/06–08
See application file for complete search history.

(56) References Cited

U.S. PATENT DOCUMENTS

| | | | | |
|---|---|---|---|---|
| 2001/0034649 A1* | 10/2001 | Acres | ................. | G06Q 30/0212 |
| | | | | 705/14.19 |
| 2010/0276484 A1* | 11/2010 | Banerjee | ................. | G06Q 30/06 |
| | | | | 235/379 |

* cited by examiner

*Primary Examiner* — Ethan D Civan

(57) ABSTRACT

Using the BitMint LeVeL digital money technology to mint self-referential money ("cherries") to be offered to bidders for sale against US$ or other fiat currency. Cherries is the only currency accepted for bidding on a presented slate of merchandise. Winning bidders walk away with the won merchandise, the sellers of the merchandise divide between them the proceeds used by the bidders to buy cherries. The cherries vanish when the game is over. This BitMint*Auction invention is a trading platform rich with incentives to do business.

13 Claims, 1 Drawing Sheet

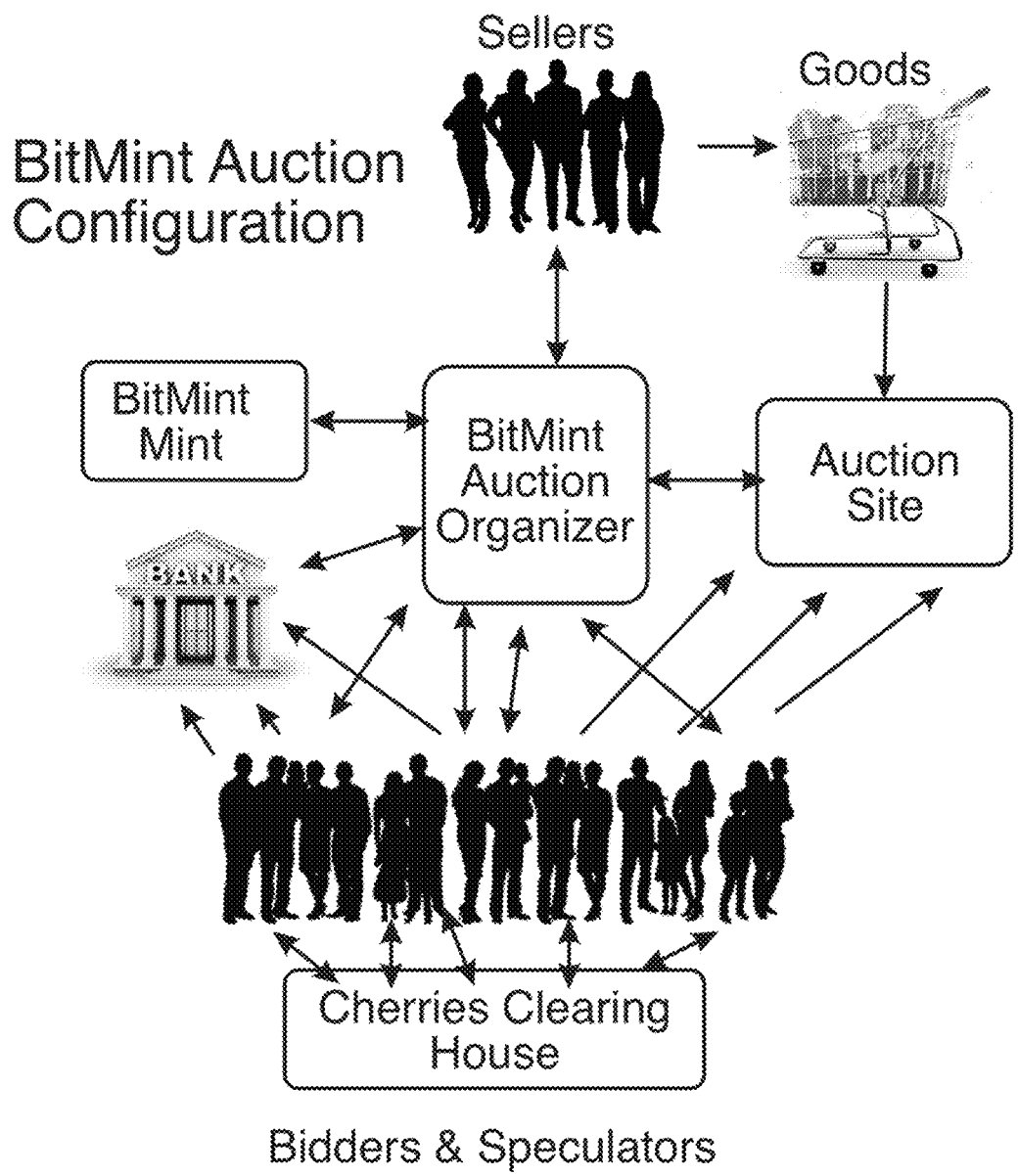

US 12,020,315 B2

BitMint LeVeL AUTO-REFERENTIAL MONEY TRADING PLATFORM

BRIEF SUMMARY OF THE INVENTION

This invention outlines several applications for self-referential money and in particular it describes a trade platform that is designed to enhance and invigorate trade by fitting it in a framework where players are challenged for strategic thinking, risk management, and probability calculus. Players are thereby offered a new dimension of entertainment. This BitMint LeVeL*Auction allows for seemingly paradoxical results where the seller is paid much more than the nominal value of his or her merchandise, but the buyer of same merchandise is paying much less than the nominal value of the same merchandise. This baffling situation comes to pass through the loss sustained by bidders who lost their bid for same or adjacent merchandise. The BitMint LeVeL*Auction is based on using fiat currency like US$ to buy self-referential term-limited digital bidding money (called cherry coins), which is the only money with which one can bid on items of goods presented for bidding. Winners of the bidding take ownership of the won items of goods. The proceeds from buying the cherries are then distributed among the sellers, so while the bidding money (the cherries) vanish when the game is over, they did achieve a transactional impact, where there are winners and losers, based on the strategic moves of the players. The BitMint*Auction is enabled by applying the BitMint*LeVeL technology to the self-referential money, the cherries.

Continuation in Part Of U.S. patent application Ser. No. 17/537,381 Filed Nov. 29 2021 This application is also a continuation in part of application Ser. No. 17/207,694 filed Mar. 21, 2021 and of application Ser. No. 15/582,784 filed May 1, 2017. This application is also a continuation in part of U.S. patent application Ser. No. 14/352,994, filed on Apr. 18, 2014 as national stage application of PCT/US2012/061331, filed on Oct. 22, 2012, which claims the benefit of U.S. Provisional Patent Application Ser. No. 61/627,977, filed Oct. 22, 2011 and U.S. Provisional Patent Application No. 61/688,788, filed May 22, 2012.

This application is also a continuation-in-part of U.S. patent application Ser. No. 15/337,203, filed Oct. 28, 2016, which is a continuation of U.S. patent application Ser. No. 14/737,924, filed Jun. 12, 2015, which is a continuation of U.S. patent application Ser. No. 13/529,399, filed Jun. 21, 2012, which is a continuation of U.S. patent application Ser. No. 12/081,412, filed Apr. 15, 2008, now U.S. Pat. No. 8,229,859, which claims the benefit of U.S. Provisional Patent Application Ser. No. 60/960,672, filed Oct. 9, 2007 and U.S. Provisional Patent Application No. 60/907,869, filed Apr. 19, 2007, This application claims the benefit of U.S. Provisional Application 63/276,662 filed Nov. 8, 2021 which was claimed by reference in U.S. patent application Ser. No. 17/537,381.

This Application also claims benefits of the following provisional applications:

Application #63/292,954 filed Dec. 22, 2021
Application #63/306,501 filed Feb. 4, 2022 all of which are incorporated by reference in their entireties.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

Bitcoin despite being a self-referential money protocol has had a big impact on society, with more chapters to be written. This draws attention to the challenge how to use self-referential money to create social good. This challenge served as a background for this invention which is a novel way to use robust and secure self-referential money to spur economic activity and commercial growth.

Overview: Whatever lies ahead for bitcoin, its chapter in history is already written and its conclusions is staggering: self referential money may have a big impact on society. Traders who bought bitcoin early and sold it high, came out with a nice net profit, no matter whatever else happens to the coin. It is therefore inviting to consider what good can be done with self referential money.

This invention outlines several applications for self-referential money and in particular it describes a trade platform that is designed to enhance and invigorate trade by fitting it in a framework where players are challenged for strategic thinking, risk management, probability calculus, and are offered a new dimension of entertainment. This BitMint*Auction allows for seemingly paradoxial results where the seller is paid much more than the nominal value of his merchandise, but the buyer of same merchandise is paying much less than the nominal value of the same merchandise. This baffling situation is explained through the loss sustained by bidders who lost their bid for same or adjacent merchandise.

The BitMint*Auction is based on using flat currency like US$ to buy self-referential term-limited bidding money (called cherry coins), which is the only money with which one can bid on items of goods presented for bidding. Winners of the bidding take ownership of the won item of goods. The proceeds from buying the cherries are then distributed among the sellers, so while the bidding money (the cherries) vanish when the game is over, they did achieve a transactional impact, where there are winners and losers, but all extract entertainment from the exercise.

The BitMint*Auction auction is enabled by applying the BitMint*LeVeL technology to the self-referential money, the cherries.

BRIEF EXPLANATION OF DRAWINGS

FIG. 1: BitMint Auction Configuration
This FIGURE shows the main parts of the BitMint*Auction auction and their relationship. In the center the BitMint*Auction organizer is depicted. It connects to the BitMint mint that mints the auto-referential bidding money (the cherries) and is used to authenticate any transaction thereto. The BitMint*Auction organizer is connecting to the sellers and agrees with them on terms. The goods offered for sale are presented in the Auction Website run by the BitMint*Auction organizer. The organizer collects US$ or other relevant flat currency from willing bidders who transfer the purchase money from their bank account and receive cherries in return. The bidders then use these cherries in bidding for the presented goods (the slate of goods). Between rounds bidders may buy or sell cherries using the common market site for the cherries: the Cherries Clearing House. Alongside the bidders some speculators may buy cherries for the purpose of making money selling them for higher prices at the Cherries Clearing House.

INTRODUCTION

Auto Referential Money is money that is born, defined, comes to existence with its trading protocol, and does not survive where its generating protocol stops playing. While it is alive auto-referential money (ARM) should have a positive impact on society for society to deploy it. &n There are two aims for money in society: (i) improve its prosperity, and (ii) improve its moral standing. ARM will have to contribute to either or both aims. The deploying society will have to have trust in the ARM generating protocol for it to work. To build trust one needs to learn well the innards of any proposal to use ARM.

Today the talk is about digital ARM, but ARM does not have to be digital. Monopoly money is ARM of physical attributes. Digital money enjoys from greater versatility and is fertile ground for the imagination.

We can choose to distinguish between ARM where the generating protocol is indefinite in term, and ARM generating protocols which have a pre planned short life, and within this short life the ARM will have to do all the good it is used for.

Term Limited ARM

This category calls for a special kind of money to pop up, do some good, and then disappear—leaving its good impact. Like people which have a definite birth date, and a definite death time beyond which they do not exist, alas leaving a legacy behind them. This class of ARM will be based on creating a specific prospect of benefit for purchasing the ARM, despite its subsequent disappearance. Before it disappears the term limited ARM will be able to do good that could not have been done without it. And that good will prompt trade.

Open Ended ARM

In this category the generating protocol is assumed to be everlasting. Somehow this ARM will attract public interest despite its baseless origin. Public interest is raised through social forces like recognition, respect, honor, shame. So in principle one needs to associate an ARM coin with a social imperative and insure scarcity, and a coin is being created. Bitcoin the pathfinder, was certainly scarce, and it came with a social whirlwind of a popular uprising. The criminal element did latch on, but bitcoin triumphed for so long because its main traders had a sense of revolution, and freedom. As the price of bitcoin rose, it necessarily transformed itself to a long lasting Ponzi scheme. That is because interest does not last forever, and when it ebbs a negative momentum develops and eventually it cannot be stopped.

Unlike term-limited ARM, open-ended ARM is too wild to seriously engineer for a well planned benefit for society.

Term-Limits Auto-Referential Money

Money generated by a protocol is disappeared by the same protocol, with no trace for the money per se. Alas, well done, this temporary money may leave behind lasting impact. In a poetic allegory, human beings are generated by a biological algorithm and disappear by the same algorithm. They leave an impact behind.

We consider here several options: (i) machine payment, (ii) crisis and disaster management, (iii) commerce enhancement applications.

In machine payment devices trade according to a specified protocol. In a crisis and disaster situation crisis money may be generated to better wade through the crisis, and that money disappears when life returns to normal. Commerce enhancement ARM is associated with socio-economic activity.

Commerce Enhancement Auto-Referential Money

A capitalistic society relies on commercial activity to power it up. At times this activity ebbs. Means to restart it are of importance. ARM can be used to enhance economic activity. We present one methodology: BitMint-Auction.

BitMint-Auction

We consider a set of transactional goods, where each item is owned by a member of a given society. members of the society have each an amount of money to pay. Commercial activity in this respect is defined by money and goods changing hands. Commercial activity powers up society so we want to enhance it.

For commercial activity to take place the goods should be well displayed so members of the society may offer current owners of a certain good item to buy their ownership status, or goods owners may offer to money holders to buy the goods item from them. This is normal plain commerce.

A common way to enhance plain commerce is the mechanism of an auction. In an auction prospective buyers are teased through the spirit of real time competition to take action and participate in commerce. To the extent that an auction is widely publicized it helps prevent outlandish deals where one pays way more than the seller would have accepted, or where the seller sells for a fraction of what the buyer would have bought.

We now introduce a method for commerce that enhances the auction procedure with the power of digital money technology, specifically auto referential money technology. This method BitMint-Auction is a different path to achieve the same end points that could have been achieved via regular auction or plane commerce. Namely an action that changes ownership of some goods and moves money around between members of the society.

The advantages of the BitMint-Auction are mainly: (i) associated public excitement that spurs commercial activity, and (ii) drawing more people to the action, (iii) derived commercial activity. BitMint-Auction exploits the human inclination to play risk-and-opportunity games, which are a profound source of entertainment and joy for so many, as evident in the stock market, sport betting, casinos and regular auctions.

We first define the concept of Auction in a formal way, and then we explain how ARM fits, followed by the details of the methodology.

Modalities of Commerce

Commerce may take place as a sum of isolated transactions (plain commerce), or as a competitive platform (some sort of auction), where transactional opportunities are shared within members of the society. We further analyse this situation as follows.

An auction is defined over some n 'goods': $G_1, G_2, \ldots G_n$. Where a 'good' is defined as a transactable item of potential benefit to members of a society. The reference society involves some h players $p_1, p_2, \ldots p_h$. Each of the h players is assumed to be associated with an amount of money $m_1, m_2, \ldots m_h$.

We define a beginning (starting) state where each of the n goods is registered to one of the players as its owner. We can now write a sparse table (matrix) where the horizontal line will list the n goods, and the vertical line will list the h players. If player i owns good j then rubric (i,j) shows 1, if not then rubric shows "0".

This is the $\Omega$ table. It shows at any moment in time the ownership matrix of the n properties (goods) by the h players.

We can also write a $\Phi$ table where the horizontal line marks points in time $t_1, t_2, t_r$, and the vertical line lists the h players. The rubrics in this table will show the amount of money held by the various players. So $m_{ij}$ represents the amount of money associated with player i at time point j.

We define a plane economic activity that takes place between time point to and time paint $t_1$ as the actions that transpired in order to effect the transition of the goods-table, $\Omega$, from its status at time point $t_0$ to its status at time pain $t_1$, and correspondingly the change in $\Phi$ from its state between the same time points.

The same four states ($\Omega_0, \Omega_1, \Phi_0, \Phi_1$) could have happened as a result of an auction. And much the same—these end states could have been a result of a BitMint-auction.

We hence define a BitMint auction as a set of activities that results in transitions of an $\Omega$ table and of a $\Phi$ table. Every BitMint auction has an equivalent regular auction and a plain commerce set of activities.

We first describe the environment, the ecology for the BitMint-Auction, then the principle of its operation.

Plain Commerce

In plain commerce a member of society, i can approach the owner of good j and offer to buy (to transfer ownership of j) from the current owner to member i. Or conversely the owner of good j can approach member i with a proposal to sell good j to them. If the two agree, then money changes hands and good ownership is switched. The $\Omega$ and the $\Phi$ matrix are changed correspondingly.

What is noteworthy about this is that the transaction occurs between two members of society without intervention, and without necessary knowledge on the part of any other party.

Plain economic activity is a sum of unrelated individual transactions. Of course transactions can happen with full knowledge of by standers, but that is optional not necessary.

Nominal Auction

In contrast to the privacy of plain commerce, an auction is a situation where the seller of a good is communicating his intent to sell to all prospective buyers, and then set out a procedure by which prospective buyers compete for the sale. Publicity hence is key for an auction. The auction will have well defined procedure with which to sort our the bids for the benefit of the seller. Here are some options: single round versus multiple rounds; and full partial or zero exposure of bids.

In a single round bidders $b_1, b_2, b_f$ are offering a price, a bid, and with all else being equal the seller selects the top bidder, or one of the top bidders if there are two or more. The selected bidder then pays the bid price and assumes ownership of the sold good.

A Single Round

A single round can be done with various modes of exposure. Exposure can be managed per the bid sums, and per the identity of the bidders.

Bidders may, or may not know what other bidders bid, and they may or may not know who the other bidders are. A successful bidder who was bidding a sum x for a certain property (good—used her in the singular, to mean one item of goods) may find that the next highest bid was 0.1x—so he over paid. Lesson for next time. A bidder aware of his competition may appraise (a) the competition appetite for the particular good, and (b) their financial resources for bidding. This would govern the bidder's auction strategy.

Most one round auctions are with zero exposure. Exposure can serve the players only if it can be used in the ext round.

Multiple Rounds

Multiple rounds operate usually with exposure of at least the bidding prices in the previous rounds. This allows eager bidders to up their bidding to the benefit of the seller.

In a typical call-out auction one bidder lays a bid, other bidders are given an opportunity to outbid that bid, and if they do, the new bid is laid before the community of bidders for someone to outbid the new price. This outbidding process can happen for several rounds until either the procedure calls it off, or the latest bid is not being outbid.

BitMint-Auction

BitMint Auction is an auction where the bidder does not use nominal money to bid on an item of goods. The bidder a-priori pays to buy "bidding money" which is the only money qualified for bidding. The novelty of the BitMint Auction is then in the introduction of the intermediary—the bidding money. Purchase of bidding money is non-reversible, failing bidders lose the nominal money they used to buy the bidding money.

The BitMint-Auction bidding money is auto-referential, it is defined in the BitMint Auction protocol, and it 'dies', expires when the protocol terminate. The BitMint Auction bidding money is ephemeral. The starting states ($\Omega, \Phi$) and end states for the BitMint-Auction are the only evidence for the BitMint auction to have occurred. These states have an equivalent nominal auction and an equivalent plain commerce. The BitMint biding money appears, and disappears within the steps of the BitMint auction procedure.

In a nominal auction the disappointed bidders hold on to their bidding money. In the BitMint auction the failing bidders (in the last round) don't get the item of goods they bid for, but are separated from the money they used to buy bidding money. On one hand this will discourage bidders, but on the other hand bidders in a multiple round environment will fight harder because failure is more painful. BitMint auction is inherently greatly exposed, with respect to the biding money used by the community, and this exposure allows bidders to strategize effectively and it challenges them to put forth a smart strategy to win the goods. It is this excitement that spruces up commerce and prosperity.

In a typical BitMint*Auction there is a strange anomaly. The seller may be very happy having sold his merchandise for much higher than a straight sale, while the buyer is very happy having bought the merchandise for much less than in straight sale. How can that be? This happens by getting the non successful bidders lose their investment in cherries.

For example: a seller offers an item of good worth $1000 in the market. The number of circulating cherries sums up to be 50,000, all bought at par 1 cherry=1 US$. Say there is only one item of goods in that auction game. The sellers does not need to buy 1000 cherries to bid on his own item because, whoever wins the item, the seller will get, say 80% of the revenue, namely selling the $1000 item for $40,000. Bidders will realize that the seller has no motivation to bid the price of the item, will go for less. One bidder will assume that some 250 people bought cherries with an average purchase of 200 cherries, hoping to buy a $1000 item for a ⅕ of its value. So that bidder buys and bids 300 cherries. If his assumption is correct, he wins, and is happy for buying the item at 30% of its nominal cost. So both the seller and the winner are happy. The losing bidders make both happy.

The non winning bidders for the $1000 item, don't lose the cherries until the game is over. If there is another round, then a second bidder might offer to buy cherries from other bidders at a discount. Some other bidders, facing the prospect of losing all their cherries purchase money, will agree to sell their cherries at a 50% discount (it happens through the cherries clearing house). So a second bidder who failed to win the item in the first round, having bid only 250 cherries (the winner was bidding 300 cherries) will buy 200 cherries at a price of $100, and bid 450 cherries on the 2nd round. If the winner of the first round had not raised his bid then the 2nd bidder wins the item in the 2nd round. The winner of the earlier round will receive back his bidding money since he lost the item of goods to the outbidding bidder. If there are no more rounds then the new winner ends up buying the $1000 items for $350. Also a good deal. If there is a third round the game is not over.

The prospect of losing the money used to purchase bidding money, cherries, will deter many from participating. This will increase the chance of the remaining participants to win one or more items in the auction for a very attractive price, which in turn will allure hesitants to participate the next time. In the extreme case, no one bids. This attracts one bidder to buy a single cherry at the last moment, and buy for 1 US$ a very pricey item. Next there will be quite a few bidders.

ARM v. Auction

People are drawn to situations dominated by risk, opportunity and probability. Especially so when competing wits are cast against each other. So while people buy insurance, and bet on sports, they are more drawn to chess, poker and other games of wit. The Idea of the BitMint-Auction trade is to create a probability dominated trading environment where competing minds cross excite each other, thereby increasing the commercial activity.

This probability dominated situation is achieved by creating a requirement, or a limitation for goods to be purchasable only with a special purpose money: "bidding money" and no other currency. This bidding money is minted by the organizer of the BitMint-auction and is put up for sale. Bidders will use "real" money to buy bidding coins with which to bid on the offered goods. The winners will collect the purchased goods. But the bidding money will vanish when the auction is terminated. The sellers of the goods will share among themselves the 'real' money which the bidders have used to purchase the bidding money.

This intermediation between buyer using 'real' money and sellers ending up with real money, creates a rich playing ground for bidders and sellers to strategize and compare wits. The most dominant factor of the BitMint-auction is that all bidders pay—the winners of goods, and those who failed to win. It is like insurance where all the insured people lose their premium only a handful that have claims end up winning. Only that unlike with insurance, with BitMint-auction there is plenty of room to maneuver. BitMint Bidding money cannot be circumvented, it is the only money that will buy the goods, but the quantity of biding money coins and the value of these coins at each live moment, are open parameters that allow for a very compelling trade environment. "Live moments" represents the time between minting the first bidding money and the time the auction terminates and the bidding money vanishes.

The auction organizer decides on the price of the bidding coins, the cherries, but is minting as many coins as the bidders are asking for. The bidders, the marketplace, may trade among themselves, with the bidding money all the time until termination. When the BitMint*Auction organizer goes into a period of time where no cherries are being sold by the organizer, then the price of the bidding coins will be determined by the balance between the supply of the bidding coins and the demand for them in the market. The BitMint auction organizer represents the sellers, the goods owners, and so will opt for a minting policy that will maximize the return for the sellers.

In summary, a group of owners of goods, present their goods for sale. Once they do they are committed to the BitMint*Auction protocol. The organizer of the sale, mints bidding money—money with a singular purpose, to buy these goods. A group of prospective buyers buys these bidding coins and uses them to bid on the goods. Successful bidders claim the goods they purchased, unsuccessful bidders lose the money they used to buy bidding coins. The money used by the bidders to buy bidding coins is distributed to the owners according to some equity formula, and also pay for the auction operation, profit for the organizer, and any chartable giving signed on to by the operation.

This BitMint-auction system though, introduces another class of winners and losers: speculators. Traders who sell bidding money at higher or lower price than they bought it. These speculators don't bid on goods, they bid on the prospect for the bidding money to raise in price.

One important feature of the BitMint money technology is that on one hand the total amount of circulating bidding coins (so called 'cherries') is public knowledge, the distribution of these coins is not known by anybody—only guessed. This distribution is critical. A bidder holding 1000 cherries with which to bid on a desired good, will see that there are 11,000 cherries circulating. If there is another bidder there, holding say 2000 cherries then the 1000 cherries bidder will certainly lose the bid, and hence will be better off selling his cherries at a discount to save part of his investment. If the 1000 cherries holder estimates that the 10,000 outstanding cherries (not his) are distributed at about 500 cherries to each of 20 bidders then the coast is clear. If the 1000 cherries holder is absolutely determined to purchase that goods, then he will go to the market to buy 9001 more cherries to insure that no one will outbid him.

One point of distinction: the exchange of goods is public domain as to the winning bids and the failing bids, while the identity of the bidders may or may not be exposed. However any trade with bidding coins can be done in complete privacy, if so desired.

A second point of distinction is that once an owner puts his goods for auction, he cannot take it back. An owner can bid on his own good though.

This illustration depicts the strategic options facing the BitMint-auction player.

The BitMint-Auction Methodology

We first define the environment: First there exists the BitMintAuction Organizer, AO. It contracts with n owners ($O_1, O_2, \ldots O_n$) of n goods ($G_1, G_2, G_n$ to 'play' a BitMintAuction 'game'. Where a game is defined as a session wherein members of the community will be invited to buy bidding money, known as "cherries" minted by the AO using the BitMint*LeVeL digital money method, and bid on the n goods in a single or a series of bidding sessions, and at the end of which the cherries will vanish, the goods will all go to their winning bidder and the money used to buy the cherries will be distributed among the n owners of the n goods, the AO, an optional charity organization, and optionally a taxing authority.

The AO will sell the cherries according to well defined rules designed to maximize the revenue of the game (maximise the amount of money used by the community to buy cherries).

The minted cherries, embodied as BitMint*LeVeL coins will be exposed as to the total amount of minted coins (cherries), but will remain confidential as to their distribution. Because a BitMint*LeVeL buyer of coins may remain anonymous, it is not clear to the public whether the outstanding cherries are concentrated in the hands of one or few coin holders, or whether they are more or less evenly distributed. This is a clear piece of information for the bidders to decide on their strategy: they don't care how many bidders compete with them, bidders only care how many bidders, if any, intend to bid a higher price.

Essential to the BitMint*LeVeL methodology is that the cherries create an open market, allowing for people to buy and sell cherries as the price of a cherry fluctuates. This fluctuations gives an opening to a third class of players, not just owners and bidders, but also speculators, who buy bidding money when cheap and profit by selling it at high prices.

We describe first simple settings and then get them involved.

BitMint-Auction Basic Mode

In the basic mode there is one owner (n=1), putting up one piece of merchandise (goods) for sale $G_1$. The goods is identified to the public and a starting bidding time to and ending bidding time $t_1$ is announced. The BitMint Auction organizer offers ephemeral coin (cherries) for nominal sale 1Cherry—1 common coin, say 1 cherry, 1 dollar. The public is invited to buy cherries and use them to bid for $G_1$. Bidding time lasts from $t_0$ to $t_1$. All information of relevance regarding $G_1$ is made public. The public is invited to buy cherries and use them to bid for $G_1$. The cherries are BitMint*LeVeL coins. When a bidder submits a cherry as a bid, the BitMint Auction organizer verifies through the BitMint protocol that the bid coin belongs to the bidder and is ready to be paid. Bidding concludes at time point $t_1$. It is noteworthy that the BitMint*Auction organizer will verify that a bidder has spending rights for a given cherry coin, but will not have knowledge of the identity of that bidder. This is an essential attribute of the BitMint*LeVeL coin.

When the bidding concludes, the BitMint Auction organizer identifies the highest bidder and passes $G_1$ to the winning bidder. The 'real' money collected for selling the cherries is distributed between owner-1, the former owner of $G_1$, the game organizer, any tax authority, and any recipient charity if any.

All bidders lose the money they used to buy the cherries.

The BitMint Auction mints as many cherries as the public demands—all at their nominal price 1 cherry=1 dollar.

In case of two or more highest bids, then a "bidding conflict resolution protocol" is activated. The winner can be selected by lottery, the conflicting winners may sort it out among themselves, or the auction is cancelled, the item of goods stays in the hands of its pre-auction owner, and the proceeds from selling the cherries may go to the designated charity, The cherries being minted by the BitMint*Auction, hide the identity of the buyers, but the total amount of circulating cherries in listed in the LeVeL public ledger.

Analysis

The owner on his part and the bidders on their parts wish not to end up big losers. The owner will be a loser if the goods is taken from him at a fraction of its common value. The bidders will lose all the real money they paid for the cherries, in case they did not get the goods, or overpaid for it. And both players want the other to lose. This is a zero sum game.

If there is little response to the auction announcement then one bidder buying one cherry and bidding it, will gain a much more valuable piece of goods, depriving its owner. Therefore the owner of a good of nominal value N, is disposed to buy about N cherries and bid on his own property with it. If there are no other bidders, or all other bidders bid lower then the owner buys his own property and gets his bidding money (about N) back, minus the part that goes to the organizer and to the beneficiary. So for the chance to get a good pay for the goods, the owner loses something (the part that goes to the auctioneer and to the beneficiary—the charity). If someone bids more than N cherries then the owner sells his property fairly.

A bidder that sees an empty ledger will buy 1 cherry, bid with it, and gain the goods at a 'steal'. However the owner, as discussed above will likely buy N cherries, so it will make no sense for the bidder to buy less than N cherries, only more.

The Bidding Time Hone Race

Let the clock come to and pass through $t_0$, and not yet come to $t_1$. Let there by m bidder $b_1, b_2, \ldots b_m$. Let the ledger be of size L cherries. Let bidder $b_1$ be the bidder with most cherries. $b^*_1$. $b_1$ will then bid the fellow bidders to buy their bids at a discount price in order for $b_1$ to become the winner. The other bidders will lose their cherries anyway at $t_1$, so they are well inclined to sell their cherries for any price above zero. A deal may be struck.

BitMint-Auction Single Goods. Multiple Rounds

In the basic mode a single good is bid for in one round. Then the game, the session, terminates. We now introduce the multiple rounds option, and first analyze a second round over the single item of goods.

The double round is defined as follows: following the resolution of the basic BitMint*Auction mode as defined above, the game does not conclude, rather a second round of bidding is announced. A time point $t_2$ is set forth—bidding time starts and finishes after a set interval $\Delta t_2$. When done, the organizer identifies the winner as follows:

The winner of the first round, $W_1$ is considered as having bid again the same number of cherries he or she bid to prevail in the auction. $W_1$ is free to increase his bid with the amount $\Delta b^*_1$, and will be considered as having bid $b^*_{w2} = b^*_{w1} + \Delta^*_{w1}$.

Everyone else owning cherries for the game is free to bid, and win the goods.

This game can be played in two versions with respect to whether more carries are sold after the first round, or not. We first analyze here the option of no more cherries sold.

Accordingly, the winner of the first round has no hold on the goods, except that he is considered as rebidding for it at least in the amount he or she bid for it in the first round. This is crucial because it creates a rich strategic field for the players. The winning amount in the first round is made public, (as well as all the losing bids—the amounts only is disclosed, not the identity of the bidders), and now all the bidders know that the winning price in round one is the price to be exceeded in order to get the goods. This means that all holders of cherries that don't have enough of them to yank the goods from the winner of round 1, will have a strong motivation to sell their cherries to someone who is still in the game, because those cherries will lose all value when the game is over.

In the case where no more cherries are sold after round one then eager bidders may agree to pay a higher price for cherries they need to take hold of the goods by bidding more than the winning price in round one. (Although the other bidders don't know if the winner of round one will increase his bid). This means that some cherry buyers don't win the goods, but make money by selling their cherries at a premium price. The price of the cherries may fluctuate wildly because if the cherries-sellers are too hard, they will lose the sale, and lose their original investment in the cherries.

If the organizer resumes selling cherries after round 1 and before round 2 then unhopeful cherry holders will be motivated to sell their cherries at a discount to yet hopeful bidders.

The same can be applied for three rounds or more. In fact if round r fetches a higher winning price than round (r−1), then round r+1 is called for to serve the interests of the goods owner. The new winning price may be only higher.

BitMint-Auction Multiple Goods

The BitMint*Auction game may be applied to n>1 goods. In that case some n' may be left out, with no bid. In general the n goods $G_1, G_2, \ldots G_n$ will have a nominal value each: $V_1, V_2, \ldots V_n$, representing the fair value commanded by each good in direct commercial offering. Let the good be organized such that $V_i \geq V_j$ for all i>j. In a nominal distribution the N cherries will be divided to $N_1, N_2, \ldots N_n$, where $$N = N_1 + N_2 + \ldots N_n$$

and where:

$$V_i/V_j = N_i/N_j$$

for all i,j=1, 2, ... n.

Note that the above applies only for goods that have been bid for, not for goods nobody bid on.

And hence the total sum used by bidders to buy cherries, C is divided to C-Organizer, C-beneficiary, C-taxes, and C-sellers, $$C = (\text{sellers} + C\text{-organizer} + C\text{-taxes} + C\text{beneficiary})$$

And C-sellers will be divided to $C_1, C_2, \ldots C_n$, such that:

$$C_i/C_j = N_i/N_j$$

for all i,j=1, 2, ... n

The way the cherries get distributed by the each bidders over the n goods, is an open question. Each cherries holder has its own strategic calculations, knowing that only the highest bidder for each of the n goods will win. Some will put all or most of their cherries on the most valued goods, $G_1$, and some on a cheaper one, figuring out that a fixed amount of cherries will have a greater chance to fetch a cheaper good, and there are no consolation prizes for second place. Then there is a personal taste, one bidder will have no fancy for a pricier good and desire instead a cheaper good. Every player will have to consider what strategy the other bidders will use, and use this analysis to fashion his or her own strategy.

A bidder will consider the following:
1. The estimated values: $V_1, V_2, \ldots V_n$ of then goods 2. The total amount of circulating cherries, N (this information is written on the BitMint*Auction public ledger) 3. The estimated distribution of N among the t bidders: $N^1, N^2, \ldots N^t$ 4. The estimated number of rounds beyond the present one.

The bidder will appraise the above according to the bidding knowledge at his or her disposal. At the moment designated for bidding, the bidder will use his or her best appraisal of the above questions, combine them with his or her personal desirability for each of the n goods: $D_1, D_2, D_n$, and so bidder i will distribute his or her $N^i$ cherries through the n goods: $N^i_1, N^i_2, \ldots N^i_n$, where:

$$N^i = N^i_1 + N^i_2 + \ldots N^i_n$$

The bidder may also decide to offer his or her cherries on the free market for sale. During the time when the organizer is offering cherries for sale at par value the bidder obviously will not be able to sell his cherries for a higher price, because the organizer mint has unlimited supply of cherries. Alas, he would be able to sell his cherries at under par. A bidder will do so if he or she concludes that his or her chances to win any goods is too low, and by selling his cherries before the bidding, he would recover some of his loss.

Computation and Communication Environment

The BitMint*Auction is operated on a community network of servers and clients. The main servers are:
1. The BitMint*Auction organizer 2. The Mint They work with clients applications used by players on their phone or on their personal computing device.

The BitMint*LeVeL method for minting digital assets is essential for the exercise of the BitMint*Auction platform. It facilitates exchange of 'real money' (durable money) against ephemeral money (cherries). The purchase of cherries may be done against BitMint*LeVeL digital claim checks for US$, thereby denying the BitMint*Auction organizer any information as to the identity of the cherries buyer. There is no law enforcement need to know the buyer's identity because the cherries are short lived. Only when a bidder claims an item of goods from the slate may there arise a need to establish the identity of the new owner of the item of goods. But even if the cherries are purchased with credit cards, they can be further transacted and be aggregated in any way while offering the hard core privacy characteristic of the BitMint*LeVeL protocol. One should note that while every bidder knows the total amount of circulating (minted) cherries—it is public domain on the public LeVeL ledger—there is absolutely no credible information as to how these cherries are divided and among how many bidders. This is crucial because the information about the distribution of the cherries is the most crucial information for bidders. A bidder worries only if a competing bidder has more cherries to bid on the item they wish to bid on. If a million bidders have 10 cherries each and the subject bidder has 20 cherries, the subject bidder is going to win the contested item of goods.

Also, the cherries in the BitMint*LeVeL format can be bid only once, by one bidder on one item of goods. Also the BitMint*LeVeL money can be split to individual cherries to allow bidders maximum bidding flexibility. Cherries are readily held in personal computing devices, instant communication with the bidding website or the cherries purchasing website is enabled, allowing for smooth and convenient engagement in the play.

The use of the BitMint*LeVeL money platform also allows bidders from around the world to participate live in the game.

The BitMint*LeVeL format also allows for an automatic clearing house operation where buyers and sellers of cherries exchange real money for cherries, over a shared dynamic price reflecting the balance between supply and demand. For embodiments of the BitMint*Auction where the rounds follow each other fast, and a whole game can start and finish in a single evening, the speed and the communication power (security too) of the BitMint*LeVeL format is indispensable.

The Players and the Play

We regard the complete design of this railway for commerce as an auction play. The auction play is comprised of games that are played either in parallel or in series. Games operate separately, they don't interact. The main categories of players are: (i) the game organizer, (ii) the sellers, (iii) the bidders, (iv) the speculators, (v) taxing authorities, (vi) beneficiaries.

The Organizer

The organizer's interest are profit, and helping the beneficiary. Therefore the organizer will strategize in order to attract as many bidders and speculators as possible because every purchased cherry shed a fraction as profit for the organizer and a fraction in favor of the beneficiary. To attract bidders, the game must include attractive chances for a large gain to the buying bidders. To attract bidders the organizer will need first to attract sellers (the owners of the n goods), to offer attractive goods. Ideally these goods will be one of a kind like original items of art, so collectors will have no other place to buy them.

The means for the organizer to make the game lively and attractive are: (i) keep uncertainty as to the number of rounds per game, (ii) keep uncertainty as to the exact nature of the slate of goods, and (iii) to siphon to the game some of the money generated by hot cherries. And of course by putting forth a strong and effective campaign of publicity and promotion.

The BitMint*Auction organizer is interested in proliferating the game, and making it more popular. The organizer makes money from every game. To that end the organizer would wish to keep a good balance between the instances where the sellers are very happy and the instances where the bidders are very happy. Where happiness is better defined as 'hopefulness' for the next round. To that end the organizer will have to adjust the many degrees of freedom available to it in this game, to shift the chances once to the sellers and once the bidders. The organizer will also wish to instill in both the sellers and the bidders the sense that a lot depends on their with and their strategy, so they keep finding a challenge in the BitMint*Auction game.

Number of Rounds

Much as nominal auctions benefit from first, second and third call, so will BitMint*Auction games. Winners of a certain round will be motivated to defend their win even if it cost them more money, and those who lost in a small margins will be well motivated to prevail in the next round, and if they don't have enough cherries might be motivated to pay premium to buy enough to win an item they desire.

It is pointless to announce the number of rounds as a fixed count ahead of time since then there will be no motivation for bidders to bid on the rounds that are not the last because except for bidding again with the money they bid before (by regulation) they will have no advantage in winning any round except the last.

The ambiguity of the number of rounds can be achieved in several ways:

1. Guided lottery 2. Purchase of voiding additional rounds 3. Price guided decision

Guided Lottery

The organizer will declare that following round 1 of a game a randomness source will be invoked such that the probability for another round, $P_{yes}$ will be preset, where the probability of no more round $p_{no}=1-p_{yes}$, will also be set.

The values of $p_{yes}$ and $p_{no}$ will guide the bidders how to handle their cherries.

Since a game should not last too long, people are eager to walk away with their new purchases, a nominal setup might be:

For round $2 p_{yes}=80\%$
For round 3 $p_{yes}=50\%$
For round 4 $p_{yes}=20\%$
For found 5 $p_{yes}=10\%$
and $p_{yes}$ is halved every round until the game ends.

Purchase of Voiding Additional Rounds

The winner of good $G_i$ in round j may offer the organizer and the seller of $G_i$ to purchase a decision to void all additional rounds for this item of goods. The purchase will be with regular money and this purchase will require the agreement of the seller of $G_i$ and the agreement of the organizer because the removal of $G_i$ from the set of goods, changes the dynamics for the rest of the goods that will sustain another round.

Price Guided Decision

There will be at least two rounds. For piece of good $G_i$ the winning price in round one is $W_{i1}$, and the winning price in round two for the same item will be $W_{i2}$.

If $W_{i2}>W_{i1}$, then Gi will put up for another round. Otherwise item Gi will be removed from the slate of bidding for the next round. How much the latter price should be above the former price will be an arbitrary determination of the organizer.

This procedure to decide will apply to round j versus round j+1, depending on the rise in price: $W_{ij}-W_{i(j-1)}$

Slate Ambiguity

The organizer will impose ambiguity prospectively on the slate of goods. different modes:
1. lottery selection from a super slate 2. ambiguous description of an item of goods Slate ambiguity will end at the moment bidding start. It will apply during the time to purchase cherries.

Lottery Selection of a Super Slate

The organizer will assemble a super slate of $n\hat{}>n$ items of goods, and will announce that a lottery selection will select n items out of the $n\hat{}$. This selection may be per game or per round.

If per round then it may serve as another mechanism to terminate bidding on a given good.

The decision which items from the super slate will be in each slate will be made at the latest at the time when bidding begins.

Ambiguous Description of an Item of Goods

An item of goods will be described with some ambiguity before bidding begins. For example, a design of a vase by a reputable designer whose name is given.

The goods may be identified with a specification sheet, which will be made public with all the details just before the bidding begins.

Siphoning Hot Cherries

A game may become hot and many bidders will vie for a small highly desired items of goods. In that case the time between the end of sale of cherries and the time of bidding will be time when the organizer does not offer more cherries. Bidders then will have the option to trade the cherries among themselves. In fact the game might have speculators who buy cherries not in order to bid for goods, but betting on their ability to sell their cherries for a price higher than par. But regular bidders may be lured to sell their cherries too. An open cherry market will be established.

The net result will be that the price of cherries in the open market ($C_h$) exceeds that of par ($C_0$).

In that case the organizer may raise its own price for the second round. If the organizer does not raise the price for successive rounds then the organizer and the sellers as swell as the beneficiary and the tax collector will not benefit from the rise in price of the cherry. But if the organizer will sell cherries at the hot price determined in the free market, then the organizer will 'steal' the profit from the speculators and the selling bidders, because the price will no longer rise in the free market because the organizer has unending supply of cherries to sell. This will increase the beneficial gain to the organizer, the sellers, the tax collectors and the beneficiaries.

The BitMint Cherry

The BitMint cherry is minted using BitMint*LeVeL technology. Bidders will pay US$ or equivalent and receive a respective value of cherries. A cherry is an auto-referential money. Namely it does not redeem against US$ or equivalent. It vanishes when the game it was minted for terminates. The cherry can be traded between bidders in the LeVeL way, namely a payer can pass cherries to a payee without either one knowing the identity of each other, and without going through the mint. The status of the cherry changing hands is reported on the cherry public ledger. The cherries public ledger reports all the circulating cherries, so this is public domain. The total outstanding cherries $\Omega$ is known, but its distribution is not. While the cherries are reported as g coins $C_1, C_2, \ldots C_g$, each coin has a unique id and indication of value, The owner of each coin is identified through a public key that does not reveal the identity of the owner. So nobody knows how the $\Omega$ cherries are distributed, or how many bidders are there, and how many cherries each bidder has.

When bidder i bids $b=n_{ijk}$ on item of goods G in round k, bidder i will submit his ownership credentials of the coins that together amount to the sum of b cherries. The organizer will verify that the bidder is the owner of this coin the way a redeemer of other-referential BitMint coin verifies the authenticity of the redeemer, or the way any LeVeL payee verifies the bona fide of the payer. This way it would be impossible that the same BitMint*Auction coin is bid on more than one item of goods, or by more than one bidder. The winning bidder will have its coins taken possession of by the organizer. Not the organizer has anything to do with these vanishing coins, but to insure that these coins are not used on another item of goods, or by another bidder on another round. The coins submitted by non winning bidders will not be touched by the organizer so that the bidder can sell them to themselves, if they wish or otherwise ensure possession of the coins that did not win the goods. In other words: once a bidder proved to the organizer their rights to spend the cherry coin, they have given the organizer the information needed for the organizer to sell the coin further. If that coin is not part of the winning bid and hence returns to the possession of the bidder then the bidder might sell the cherry coin to itself, which according to the BitMint*LeVeL protocol will add a secret key to the coin and will not allow the organizer to use same coin.

In case that there is a next round then the winning sum $w_{ij}$ bid by bidder i on item of goods j will be considered being bid by bidder i for the next round, only that the winning bidder will be allowed to increase his or her bid for the next round.

The Sellers

The sellers wish to use the BitMint*Auction platform to increase the revenue form selling the goods relative to nominal platform. They might do so if the organizer will manage to create excitement that will draw enough people to the game so that there will be more real dollars to be distributed among the sellers and others.

The sellers will want to be careful as to who joins them in the game, this choice will make a difference as to the revenue they log.

The sellers stand the risk to lose their goods for too little pay. This risk that can mitigate by themselves bidding on their goods for the minimum they wish to part with them for. What attracts the sellers is the option to make much more money for selling their goods then otherwise.

Unlike the bidders who are strangers to each other, the sellers know who are the other sellers for the same game. The right combination of sellers makes a big difference. The identity of the sellers may be important in some cases but in general what is more important is the identities of the goods that are combined into a single game. One attractive item of good can pull up a wake of much less attractive goods. Especially if a star item of goods causes the open market to rise in price of the cherries. The organizer will take advantage of this rising and will charge a hot price for the next round, raising more money to be divided between sellers. Heavy negotiations may be expected between sellers who wish to join a game party (join the merchandise slate) and other who wish them out. There is a lot uncertainty as to the behavior of the bidders and it is hard for the sellers to know what is best. If the sellers will not expect to net more than in regular commerce they will not participate.

The Bidders

The bidders are drawn into the game either because one of the goods is special, unique, one of a kind, and impossible to purchase elsewhere, or by the prospect of getting goods at a very attractive price by underbidding while other bid even less, perhaps because they route their cherries to a more attractive item of goods.

The bidders know how many cherries were bought, because the BitMint*Auction method lists all active digital coins (cherries) on a public ledger. There is a notification of owner for each cherry coin, but it is not clear how many identification of ownership really represent a single owner, and therefore potentially a single bid. The bidders don't know how many other bidders they are competing against.

Each bidding round is published as to the various bids that competed for a particular item of goods. The sums are made public, not the identities of the bidders, which will not be known to the organizer (that is the LeVeL way), except of course the winner that claims the goods. The distribution of bids tells the bidder important information on the competition and help each bidder to plan his or her strategy for the next round.

Willing bidders may get together to form strategic groups, and then share the spoils. By pooling cherries a group may have more power to play the odds against other bidders.

The Speculators

The speculators buy cherries for the purpose of selling them at a premium price to bidders eager to win a particular item of goods while the mint, the organizer is not selling any more. The speculators can buy a small amount which they don't think will win them any item of goods, which they don't intend to bid on anyway.

Taxing Authorities

Taxing authorities may levy a game tax on top of regular taxes on all parties. The BitMint*Auction game has characteristics similar to casino and similar taxation rules may apply. Authorities may invite BitMint*Auction operators to their territories with all sorts of attractions in order to benefit from the taxation income.

The Beneficiaries

The beneficiaries will have a net gain of funds from the BitMint*Auction operation. So they will add their moral weight to the promotion of the game.

Cherries Pricing

Bidding money, cherries, vanish when the game they were minted for terminates. They do carry value as the sole currency recognized for bidding on the n goods of the game. The only cherry holders who benefit from their holding are those who successfully bid their cherries on a good, or sold their cherries for a higher price than what they paid for it. Thus the attraction of the n goods, and the psychology of the bidders is the driving force for bidders to shell real money, say US$, to buy vanishing bidding coins.

The BitMint*Auction game is essentially a game of expectation, probabilities and strategies. uncertainties are about:

1. the slate of goods 2. the competition (other bidders and their intents). 3. the number of rounds 4. the price of cherries in the free market Pricing can be handled in three modalities.

Pricing Modalities

We present three pricing modalities:
1. Fixed Pricing 2. Hot Pricing 3. Boiling Pricing The BitMint*Auction organizer decides on the modality, which can change from game to game. In fixed pricing the BitMint*Auction sells cherries at par value throughout the game. In hot pricing the BitMint*Auction may increase the price of cherries from round to round. In the "boiling" modality, the price of cherries will rise throughout the period of cherry sale for a given round. This reflects the fact that a late buyer has the advantage of reading on the cherry ledger how many coins have been minted already.

BitMint Auction Manifestation

The BitMint*Auction may manifest itself in a large variety of options. For example:
1. Long Term risk management tool 2. Event Auctions 3. Art Sale 4. Clearing sale 5. Commodities Long Term Risk Management Tool The BitMint*Auction platform may be used to manage long term risk. Cases in point:
Long Term Construction Long Term R&D Long Term Construction A long term construction project may sell equity shares via the BitMint*Auction platform. The interval of time to purchase cherries will close long before the bidding interval of the current round. Bidders will have to decide how much money to invest in cherries long before the construction is built or the project is complete. When it would be time to place bids the construction may be ahead of schedule and look extra good. The equity in project will look very attractive and bidders may strive to buy more cherries in the free market (from other bidders)—describing one scenario, Long Term R&D Equity in the fruits of a long term R&D may be divided according to the BitMint*Auction platform. Here too there may be a long time period between the end of sale of cherries from the organizer and the start of bidding in the current round. This will push believers in the R&D project to spend money upfront and thereby fill the cash register of the R&D project at the very beginning. Same for successive rounds.

This manifestation will require extensive disclosure of the state of the R&D at time of bidding.

Event Auctions

The BitMint*Auction many manifest itself in a form of an event that starts and ends at the same evening. Bidders will congregate in a hall that will display the items of goods for sale. As the bidders move about they will use their phones to buy cherries, within say an hour slated for purchase. A few minutes later the bidding will start, and a few more minutes later the bidding will end. The results will be announced, and the next round will begin, so on and on until the last round. The winners will walk away with the goods they won. The suspense will be palatable and the event a packet of sheer entertainment for all.

Art Sale

Art work have floating values therefore they sell well in regular auctions. The BitMint*Auction will be an interesting alternative. Especially the BitMint*Auction platform can package together well known artists and novices. This platform might be very advantageous to starting artists.

Clearance Sale

Often it happens that a company goes bankrupt or a storm or an accident ruins a site and what is left is destined to sell—the BitMint*Auction platform will be useful.

Commodities

The BitMint*Auction platform may be applied to commodities, namely to goods that have a clear market price and market availability. Players nonetheless will opt for the BitMint*Auction platform in order to match with other buyers and come ahead. Commodities auctions make more sense if availability is a problem.

Obviously no one will bid X>Y for a commodity available at price Y elsewhere and readily. Also no owner of a commodity will sell it in the auction platform for less than Y. This seems to nail the price of any considered commodity to its price outside the platform, so the BitMint*Auction platform serves a little role. But here comes the twist of the BitMint*Auction. It allows the seller to maneuver himself to selling the commodity for much more money than the nominal market will fetch, and at the same time it allows buyers of this commodity to pay much less than the outside price Y. This apparent contradiction actually can transpire. This scheme is paid by the money paid by losing bidders. In the extreme the items of goods may be packs of cash.

Illustration. the simplest embodiment. One seller sells a commodity worth on the market $100, readily available. Clearly no bidder will pay more than 100 cherries. Alas, bidders will fancy acquiring the commodity for much less. For a while there are no bidders, so Alice buys 10 cherries, hoping to bid this money and buy a $100 merchandise for a cost of $10 dollars. She spreads the $10 as a 2$ coin, following by the $3 coin, following again by a $5 coin. Each coin she puts a different owner identifier, as allowed in the BitMint*LeVeL protocol. This creates the impression that three bidders are competing against each other, each upped the ante on the one before. Indeed Bob thinks so and buys 8 cherries (for $8). Meanwhile, Zach, the seller is worried that only 18 cherries have been bought, so he himself buys 20 cherries. Alice now sees that the total number of circulating cherries is 38, (10 hers, 28 from other bidders). At the last moment before closing Alice buys 19 More cherries, and then bids the 29 cherries at her disposal. Zach bid the 20 cherries he purchased and loses. Alice buys a $100 commodity for $29. Alice decision to buy 19 cherries was based on the following logic. The ledger contains 38 cherries, 10 are hers. So the worst case for her is that someone owns all the rest (28 cherries). To outbid this someone Alice will need 29 cherries. She already has 10, so she buys 19 more.

In another scenario three more bidders in the last moment FIGURE the commodity is for the taking. Carla assumes that the 38 cherries were bought by bidders looking for a steal, so she assumes that the each bidder has no more than 12 cherries. She therefore buys 20 cherries to be on the safe side—in three coins 5, 7, 8 cherries respectively. David comes along and realizes that the ledger contains only 58 cherries, so he buys 59 cherries, to insure a win. Indeed he wins. However the seller, Zach will benefit from a total of 117=58+59 cherries (some will go to the organizer, some for taxing and some for the beneficiary, but mostly to Zach). So all told David bought a $100 commodity for $59, and Zach sold the same commodity for $117. This magic happened because Alice, and Bob and Carla ill-strategized (they had fun all the same . . . ).

Of course the above calculus would change if the game was played with boiling prices.

Glossary

Cherry

A cherry is a self-referential BitMint coin minted by the BitMint*Auction organizer, offered to the public. It is the only currency with which to bid on the merchandise (goods) offered for sale in a BitMint*Auction game. When the game served by these cherries terminates, these cherries lose all value and vanish.

BitMint*Auction

The BitMint*Auction is a trading platform, comprised of 'games'. It creates a unique alternative to straight commerce in a community.

Goods

Goods, merchandise are items of community value offered for sale through the BitMint*Auction platform. The term 'good' is used here to reflect a single item of goods. Alternatively the term merchandise is used.

A Game

A game is an embodiment of the BitMint*Auction trading platform. It is managed by the BitMint*Auction organizer. It has a starting day and time, and a termination day and time. It involves sellers of goods, bidders on these goods, and speculators. A game is divided to time intervals allowing for purchasing of bidding money (called cherries) from the BitMint*Auction organizer, followed by periods for biddings, where a combination of such two periods of time defines a round. A game is a succession of rounds. At the end of the rounds the BitMint*Auction organizer passes the merchandise to their winning bidders, and divides the proceeds that were gathered from the bidders and the speculators who purchased cherries. The lion share of these proceeds goes to the sellers in proportion to the number of cherries that were bid by the winning bidder for that merchandise.

Sellers

People or Agencies who own a merchandise submitted for bidding in a BitMint*Auction game.

Bidders

People who buy cherries and use them to bid on merchandise.

The BitMint*Auction Organizer

The person or organization that takes the initiative to define terms, bring together sellers and other stakeholders, announce, promote, and conduct the BitMint*Auction game.

The BitMint*Auction Taxing Authority

Any authority that by law can tax raw revenues of the game before any detailed tax accounting. Authorities may give incentives to BitMint*Auction organizers to come to their jurisdiction and conduct event type games there, in order to collect game taxes. Unlike straight gambling, while there is here an element of a lottery, in its essence the BitMint*Auction is a trading platform, like eBay.

The BitMint*Auction Beneficiary

The BitMint*Auction organizers may decide to dedicate a cut from the revenues to a widely recognized charitable organization, serving a social cause. This will increase the moral attraction of the game, and do a lot of good. In fact, such charitable beneficiaries may themselves become BitMint*Auction organizers.

The Speculators

Speculators buy cherries for the purpose of selling them at a higher price later in the game.

Play

A play refers to the action of this platform. It may refer to a single round, or to a full game.

Players

Players are any of the parties involved in a play: organizers, sellers, bidders, and speculators. Usually the beneficiaries and the taxing authorities are not referred to as players.

The Mint

The BitMint*Auction platform is minting auto-referential coins, called cherries, using the BitMint mint technology as referenced in the continued application.

BitMint*Auction Platform

The set of communicating computers, with their code, and regulations used to exercise the BitMint*Auction play, all the run games with their various rounds, including the final disposition of goods and money.

Illustrations

We illustrate a few cases.
1. art sale 2. R&D investment 3. event sale

Art Sale

Let Alice be a painter who sold her work for an average of $25,000 a painting, and Bob is a painter who sold his work on average for $15,000 a piece. Carla, and David, by contrast, are novice painters who have no record of sales. The organizer convince Alice, Bob Carla, and David, to join into a game, and offers a strategy. Four painting of each painter will be presented to the bidding public. The public will be notified that after the purchasing is closed, two of the paintings will be presented for bidding, the selection which two, will be made randomly after the purchase of cherries is concluded so that the choice cannot leak.

On January 1, the BitMint*Auction organizer announces a new BitMint*Auction game, with identity HU-100. Cherries at par value (1 cherry=1 US$) will be available for sale from January 10 to January 20. On announcement of HU-100 (January 1st) the organizer presented the 4 painting involved in the game. The paintings are presented in a small annex to the city museum, available for the public to inspect. Two out of these four will be randomly selected for the current game. Bidding starts midnight January 30-January 31st and ends midnight February 1st-2nd. After the first round a lottery will determine if there will be another round. The chance for another round will be 65% and the chance for no more round will be 35%.

The bidders are baffled. They are ready to pay the going rates for painting by Alice and Bob but they are not prepared to shell anything like these sums on work by the two novices (Carla, and David). Smart bidders resort to probability calculus. There is a 2/12 chance for both the paintings of Alice and Bob to be in the game. There is a 2/12 chance for neither Alice's nor Bob's painting will be in the game. But the chance for at least of Alice or Bob painting will be in the game is 8/12. So the chances are overwhelming towards at least one of Alice or Bob painting to be in the game. &n The bidders may be divided to classes:

1. Class Alice—bidders who are only interested to buy Alice's painting 2. Class Bob—bidders who are only interested to buy Bob's painting 3. Class Alice-Bob—bidders who are interested in buying either Alice or Bob's 4. Class Carla—bidders who are only interested to buy Carla's painting 5. Class David—bidders who are only interested to buy David's painting 6. Class Carla-David—bidders who are interested in buying either Carla's or David's 7. Class speculators—false bidders who are interested in selling cherries at a premium price The various classes will go through different reasoning when deciding to participate. The fact that the window for buying more cherries from the organizer has closed, means that there can be no more surprises in terms of circulating cherries, which makes the strategic task for bidders a bit easier. They may now haggle and negotiate buying or selling cherries among themselves to satisfy their objectives. There is no ban on the bidders to either negotiate over cherries, and over joining forces while maintaining their privacy (hidden identity) from each other, nor is there a ban on bidders to expose their identity and deal with other bidders in the open.

BitMint Auction Investment Coin

An investor assembles and an opening investment fund F to start investment at time $t_i$, with plans to cash out the investment in amount a return amount R at time $t_r$. A BitMint*Auction organizer will announce a 'game' over a share of the invested amount, $F' \le F$. This share will be made the goods to be won in the game. The rounds will take place as the investment rolls through the days fro $t_f$ to $t_r$. The higher the investment rises, the higher rise the price of the cherries in the free market, allowing the organizer to offer cherries at a higher price and thereby increase, may be several folds of the return of the smart investor who made an investment of F to a much larger R. Without the BitMint*Auction the investor will only benefit from the rise of the stock, not from the deluge of high price cherries which by the end of the day he claims.

We in particular describe here the ignorant investment coin

Ignorant Investment Coin

The ignorant investment coin procedure proceeds as follows:
1. The investor secures an investment capital X
2. The investor identifies a group of investment candidates.
3. The investor invests X in a randomly selected share $S_1$
4. The investor selects a time interval $\Delta t$, at the end of which he removes an amount $R_1$ from $S_1$
5. $S_1$ is accumulated to a fund $\Omega$.
6. The investor invests the funds $\Omega$ in a randomly selected share $\Omega$ in the group.
7. The investor repeats steps 4-6 until termination or until all shares in the group are invested in.
8. Steps 4-6 are repeated with the $\Omega$ fund accumulates and not returned to the group. It may be invested in other groups, in other sessions of investment as the above.

The determination of the amount R is done as follows:
1. if the value of the investment in S is lower by the end of the time interval, then half of value of the fund in S is cashed out and added to $\Omega$.
2. If the value of the investment in S is higher by the end of the time interval then half of gain becomes R and is moved to $\Omega$.

$\Omega$ accumulates the R funds siphoned out from all the active shares.

Generic Level

BitMint*LeVeL refers to the standard BitMint coin. Albeit, the LeVeL trade protocol may apply to any digital asset identified with a unique ID and a value statement—written in which every way. Unlike the BitMint coin, the generic LeVeL protocol will not refer to a coin written in public and private fashion, and hence will be a tad weaker, but nonetheless, it will ensure trade integrity of the traded digital asset. It will be passed around only by its lawful owner.

Operational Summary

This invention comes down to a method (part 1) to enable trade through a trade platform called BitMint*Auction, where strategic thinking, probability calculus, and risk-taking create outcome opportunities not available otherwise, allowing a seller of a certain merchandise to be paid much more than in a case of price negotiation with a buyer, while the buyer pays less than in the case of price negotiation with the seller; this apparent inconsistency is reconciled by having one or more losing bidders for the merchandise pay for the difference; the intellectual challenge posted by this platform, as well as its entertainment value, build a strong incentive for a more active trade;

The BitMint*Auction platform is managed by a BitMint*Auction organizer, it involves sellers, bidders, and a slate of merchandise;

the trading currency of the BitMint*Auction is auto-referential money, digital coins called "cherries", which are minted according to the procedure identified in the continued application Ser. No. 17/537,381; these cherries are bought with US$, or other fiat currency, and are used to bid on goods listed by sellers for sale to the highest bidder;

the BitMint*Auction platform is comprised of a series of games, where a game is a procedure where sellers present n goods $G_1, G_2, \ldots G_n$ for sale, and interested bidders buy from the BitMint*Auction organizer cherries to bid on these goods; the highest bidder for each item of goods gets the bid item of goods;

when the bidding is over, the game terminates, the cherries become void of any value, and the money used to purchase the cherries is divided between the sellers, and the game organizer;

the BitMint*Auction platform is embodied through a BitMint*Auction server run by the BitMint*Auction organizer; it facilitates communication with the sellers and the bidders; the sellers present and describe their goods for sale, and the bidders use an application on their personal computing device to connect with the BitMint*Auction server to buy cherries, and to place their bids on the goods presented for bidding.

Part 2: The invention also specifies that the method in part 1 is where the game is comprised oft rounds, where a round is an occasion for bidders to place bids on the goods, and where $B_{ij}$, the winning bidder in round i for item of goods j for $i=1, 2, \ldots t$ and $j=1, 2, \ldots n$ was bidding $w_{ij}$ cherries, and is considered to be bidding $w_{i+ij}$ for item of goods j in round (i+1) plus any additional arbitrary amount of cherries $u_{i+1j}$; the losing bidders in each round, except the last, get back their bidding cherries.

Part 3. The method of part 2 where the BitMint*Auction organizer is setting forth declared periods of time as follows:

a game begins with the BitMint*Auction making a public announcement of the game, at time point TOA, the game continues with t rounds, at the end of which there is a time period for disposition of goods that changed hands, this period ends with an announcement of the end of the game TEA; and where the BitMint*Auction organizer is dividing each round to successive periods:
(i) announcement: the period of time from public announcement of a round (TOR) to the time when bidders can buy cherries for it, (TPS),
(ii) purchase: the period of time from the moment that purchase of cherries is available, (TPS), to the period of time when the BitMint*Auction organizer does not sell any more cherries, (TPE),
(iii) strategy: the period of time when the bidders plan how to use their cherries over the slate of merchandise, from TPE to the time bidding starts, (TBS)
(iv) bidding: the period of time from when bidding is allowed to start, TBS, to when bidding ends, TBE;
(v) closure: the period of time from end of bidding for the round, for rounds: 1, 2, ... (t−1), and the announcement of the next round, and for round t, closure is the period of time from end of bidding of round t and the final disposition of the goods between sellers for whom no one was bidding for their items of goods, and the bidders who won items of goods in the last round, t.

Part 4. The method in part 3 where the BitMint*Auction organizer sells cherries according to one of the following three pricing choices:

(i) fixed par value: the BitMint*Auction organizer is selling cherries at par 1cherry=1US$, in the purchase period for each round, satisfying the full demand for each round;

(ii) limited fixed par value: the BitMint*Auction organizer is selling cherries at par 1 cherry=1US$ for rounds 1, 2, . . . r, where r is an arbitrary integer smaller than t, and is selling no more cherries for rounds (r+1), (r+2), t;

(iii) hot pricing: the BitMint*Auction organizer is selling cherries at par 1 cherry=1 US$ for rounds 1, 2, . . . r, and is selling cherries for rounds (r+1), (r+2), . . . t at higher price;

(iv) boiling pricing per round: the BitMint*Auction organizer is selling cherries for a given round according to a formula whereby cherries bought later within the purchase period (TPS to TPE) cost more;

for every purchase period the BitMint*Auction organizer is offering as many cherries as are being demanded by buyers.

Part 5. The method of part 4 where certain people, speculators, are buying cherries not for bidding on the merchandise but for the purpose of selling cherries to bidders either at a price lower than the current price offered by the BitMint*Auction organizer, or by any price at the periods of time when the BitMint*Auction organizer is not offering cherries for sale.

Part 6. The method of part 5 where the BitMint*Auction organizer is setting up a clearing house, operating as a public market for cherries wherein bidders and speculators may offer cherries for sale, or offer to buy cherries, allowing the price of a cherry to be shared by buyers and sellers, and be determined by the balance between supply and demand, and where the transactions of cherries takes place according to the trade procedure specified in the continued application Ser. No. 17/537,381.

Part 7. The method of part 2 where (i) the bidding of goods is done by the bidder proving to the BitMint*Auction organizer that they have spending rights for the cherries they use in the bidding;

(ii) the cherries used in an unsuccessful bid are returned to the bidder;

(iii) the price in cherries that others have been bidding is made public by the end of bidding time (TBS to TBE), without identifying the identities of the various bidders, and where (iv) the bidders and the speculators are being notified by the BitMint*Auction organizer so they know at each moment how many cherries have been sold and are bidding-ready, but they don't know how these cherries are distributed to an unknown number of bidders.

Part 8. The method of part 2 where the determination on conducting another round is taking place according to one of the following criteria:

(i) pre-determination: the BitMint*Auction organizer is announcing the number of rounds when the game is announced, (ii) lottery: the BitMint*Auction organizer is announcing a probability distribution between no more rounds and another round, a source of randomness is engaged to determine whether another round is played or not according to the probability distribution, this determination takes place after the current round has been completed;

(iii) value increase: the BitMint*Auction is announcing at the beginning of the game a percentage of price rise, $\Delta W_{ij}$ for item of goods, j, reflecting the rise in the winning bid from the round before the current (i−1), to the current round, i; if $\Delta W_{ij} < (W_{ij} - W_{i-1j})$, then round (i+1) takes place, for item of goods, j, otherwise round i is the last round for item of goods j.

(iv) the winning bidder of the current round will propose to buy from the BitMint*Auction organizer and the seller a decision to terminate the game for the items of goods which the winning bidder won; if the seller of the item for which termination has been proposed and the BitMint*Auction organizer come to terms with the winning bidder, then there are no more rounds for the item of goods for which termination was proposed.

Part 9. The method of part 8 where in each round one or more items of goods are removed from the slate of goods, and the game is over when the last item of goods has been disqualified for another round.

Part 10. The method of part 1 where the money collected by the BitMint*Auction organizer selling cherries is being divided between:

a taxing authority that requires a share of the collected money by law a beneficiary—an organization supporting a charitable cause the BitMint*Auction organizer for its operational cost and for its profit margins, the sellers, (their collective share)

where the sellers are distributing their collective share at values $v_1, v_2, \ldots v_n$, such that:

$$M_{sellers} = V_1 + V_2 + \ldots V_n$$

where $M_{sellers}$ is the share of the money used to purchase the cherries (the proceeds) allocated to the sellers as a group; and where:

$$V_i/W_{ti} = V_j/W_{tj}$$

where $W_{ti}$ is the winning value (in cherries) for item of goods, i in the last round, t. and where $W_{tj}$ is the winning value for item of goods, j in the last round, t.

Part 11. The method of part 1 where an initial slate of m items of goods is presented, upon announcement of a game, and the announcement says that n≤m items of goods from the initial slate will be selected for the actual slate of items of goods for the game, and where the selection of these n items of goods is exercised and is notified to the bidders just before bidding begins.

Part 12. The method in part 1 where if two or more bidders are both the highest bidders, then the BitMint*Auction organizer exercises one of the following options:

(i) lottery, a randomness source is engaged to resolve the selection issue (ii) The bidders who shared the highest bid are given a game just for them, and just over the disputed item of goods, where each bidder is allowed to buy more cherries from other bidders and speculators, but not from the organizer;

(iii) the item for which more than one bidder bid the highest bid, is removed from the slate of merchandise, and returns to the seller.

What is claimed is:

1. A process designated as a 'round of auction' organized by an Auction Organizer, AO, in which an arbitrary number n of bidding goods $G_1, G_2, \ldots, G_n$ is presented to be bid on by an arbitrary number m of bidders $B_1, B_2, \ldots B_m$, where the bidding is done with a dedicated bidding currency DBC wherein a mint mints the DBC as digital coins, using a method comprising:
the recipient paying the price of the minted DBC coin, and in return receiving a bit string, wherein a number of bits in the bit string is used to represent a coin value of the DBC digital coin and bit values of bits of the bit string are used to determine an identity of the digital coin;
validating the identity of the digital coin, by the mint wherein the validating comprising:
comparing bit values of at least a portion of the bits of the bit string to bit values of corresponding bits of known bit strings that represent known issued digital coins;
and checking that a matching known issued digital coin was not redeemed;
further comprising splitting the digital coin to multiple digital coins, each of the multiple digital coins comprises a continuous sequence of bits that forms a portion of the bit string of the digital coin;
each good $G_i$ for i=1, 2, . . . n is claimed by the highest bidder,
and where the DBC is purchased before the round of auction takes place,
where each bidder $B_j$ for j=1, 2, . . . m is buying per their choice $C_j$ DBC units; at a declared fixed rate of DBC;
the winning price for good G is $W_i$ DBC units; the sum of all the winning bids is $$W^* = \Sigma W_i \text{ for } i=1,2, \ldots n;$$

the total amount of money ($ or another national currency) collected in sales of DBC for the round of auction is $$M = X^* \Sigma C_j \text{ for } j=1 \text{ to } j=m;$$

the seller of good G is paid the amount:

$$P_i = (W_i/W^*)^*(M-F)$$

where F is the fee charged by the AO.

2. The method in claim 1 applied to a series of auction rounds, a game, where the game is comprised oft rounds, where a round is an occasion for bidders to place bids on the goods, and where $B_{ij}$, the winning bidder in round i for item of goods j for i=1, 2, . . . t and j=1, 2, . . . n was bidding $w_{ij}$ DBC coins and is considered to be bidding $w_{i+1j}$ DBC coins for item of goods j in round (i+1) plus any additional arbitrary amount of DBC coins, $u_{i+1j}$; the losing bidders in each round, except the last, gets back their bidding BDC coins.

3. The method of claim 1 where the AO is setting forth declared periods of time as follows:
a game begins with the AO making a public announcement of the game, at time point TOA, the game continues with t rounds, at the end of which there is a time period for disposition of goods that changed hands, this period ends with an announcement of the end of the game TEA; and where the AO is dividing each round to successive periods:
(i) announcement: the period of time from public announcement of a round (TOR) to the time when bidders can buy DBC for it, (TPS),
(ii) purchase: the period of time from the moment that purchase of DBC is available, (TPS), to the period of time when the AO does not sell any more, DBC coins, (TPE),
(iii) strategy: the period of time when the bidders plan how to use their DBC coins over the bidding goods from TPE to the time bidding starts, (TBS)
(iv) bidding: the period of time from when bidding is allowed to start, TBS, to when bidding ends, TBE;
(v) closure: the period of time from end of bidding for the round, for rounds: 1, 2, . . . (t−1), and the announcement of the next round, and for round t, closure is the period of time from end of bidding of round t and the final disposition of the goods between sellers for whom no one was bidding for their goods, and the bidders who won goods in the last round, t.

4. The method in claim 3 where the AO sells DBC according to one of the following three pricing choices:
(i) fixed par value: the AO is selling DBC at par 1 unit of DBC=1US$, in the purchase period for each round, satisfying the full demand for each round;
(ii) limited fixed par value: the AO is selling DBC at par 1 cherry=1US$ for rounds 1, 2, . . . r, where r is an arbitrary integer smaller than t, and is selling no more DBC for rounds (r+1), (r+2), . . . t;
(iii) hot pricing: the AO is selling DBC at par 1 DBC unit=1 US$ for rounds 1, 2, . . . r, and is selling DBC for rounds (r+1), (r+2), . . . t at a different price;
(iv) boiling pricing per round: the AO is selling DBC for a given round according to a formula whereby DBC coins bought later within the purchase period (TPS to TPE) cost more;
for every purchase period the AO is offering as many DBC coins as are being demanded by buyers.

5. The method of claim 4 where individuals (speculators) are buying DBC not for bidding on the merchandise but for the purpose of selling DBC to bidders either at a price lower than the current price offered by the AO, or by any price at the periods of time when the AO is not offering DBC for sale.

6. The method of claim 5 where the AO is setting up a clearing house, operating as a public market for DBC wherein bidders and speculators may offer DBC for sale, or offer to buy DBC, allowing the price of a DBC coin be determined by the balance between supply and demand.

7. The method of claim 2 where
(i) the bidding of goods is done by the bidder proving to the AO that they have spending rights for the DBC they use in the bidding;
(ii) the DBC used in an unsuccessful bid are returned to the bidder;
(iii) the price in DBC coins that others have been bidding is made public by the end of bidding time (TBS to TBE), without identifying the identities of the various bidders, and where
(iv) the bidders and the speculators are being notified by the AO so they know at each moment how many DBC coins have been sold and are bidding-ready, but they don't know how these DBC coins are distributed to an unknown number of bidders.

8. The method of claim 2 where the determination on conducting another round is taking place according to one of the following criteria:
(i) pre-determination: the AO is announcing the number of rounds when the game is announced,
(ii) lottery: the AO is announcing a probability distribution between no more rounds and another round, a source of randomness is engaged to determine whether another round is played or not according to the probability distribution, this determination takes place after the current round has been completed;

(iii) value increase: the AO is announcing at the beginning of the game a percentage of price rise, $\Delta W_{ij}$ for item of goods, j, reflecting the rise in the winning bid from the round before the current (i−1), to the current round, i; if $\Delta W_{ij} < (W_{ij} - W_{i-1j})$, then round (i+1) takes place, for item of goods, j, otherwise round i is the last round for item of goods j;

(iv) the winning bidder of the current round will propose to buy from the AO and the seller a decision to terminate the game for the items of goods which the winning bidder won; if the seller of the item for which termination has been proposed and the AO come to terms with the winning bidder, then there are no more rounds for the item of goods for which termination was proposed.

9. The method of claim 8 where in each round one or more items of goods are removed from the slate of goods, and the game is over when the last item of goods has been disqualified for another round.

10. The method of claim 1 where the money collected by the AO selling DBC is being divided between:

a taxing authority that requires a share of the collected money by law, a beneficiary—an organization supporting a charitable cause the AO for its operational cost and for its profit margins, the sellers.

11. The method of claim 1 where an initial slate of m items of goods is presented, upon announcement of a game, and the announcement says that n≤m items of goods from the initial slate will be selected for the actual slate of items of goods for the game, and where the selection of these n items of goods is exercised and is notified to the bidders just before bidding begins.

12. The method of claim 1 where if two or more bidders are both the highest bidders, then the AO exercises one of the following options:

(i) lottery, a randomness source is engaged to resolve the selection issue (ii) the bidders who shared the highest bid are given a game just for them, and just over the disputed item of goods, where each bidder is allowed to buy more DBC from other bidders and speculators, but not from the AO;

(iii) the item for which more than one bidder bid the highest bid, is removed from the slate of merchandise, and returns to the seller.

13. The method of claim 1 wherein DBC may be bought and sold by the public with mutual anonymity: the buyer will pay for the DBC coin with public acceptable digital money PADM, that does not disclose the identity of the payor of the PADM; the DBC will be minted as a digital currency that is paid without exposing the identity of the DBC payor.

* * * * *